2,951,062
PROCESS FOR POLYMERIZING VINYL CHLORIDE

Rudolph D. Deanin, Florham Park, and Richard G. Dell, Fords, N.J., assignors to Allied Chemical Corporation, a corporation of New York No Drawing. Filed Feb. 17, 1956, Ser. No. 566,086

10 Claims. (Cl. 260—87.1)

This invention relates to a process for polymerizing vinyl chloride alone or together with other monoethylenically unsaturated compounds (containing a single unsaturated linkage of the structure $>C=C<$) copolymerizable therewith, with the monomers dispersed in water as the medium in which the polymerization is carried out, employing a methyl cellulose of particular characteristics to maintain the monomer and polymer which is formed therefrom, dispersed in the reaction medium.

Numerous processes are known for preparing vinyl chloride polymers or copolymers by polymerization of the monomers dispersed in aqueous reaction media. One type of such dispersion polymerization procedure employs various high molecular weight compounds as dispersing agents for the monomers and the polymer produced therefrom. These agents do not act to emulsify the monomers and cause formation of relatively stable emulsions or latices of the polymer. While they aid in maintaining the monomers dispersed in the aqueous reaction medium, the dispersion is such that the resulting polymer product is of larger particle size than the resin particles in the emulsions or latices and, hence, are readily separable from the mother liquor by settling, centrifuging or filtering, as compared to the products produced when an emulsifying agent is used as the dispersant.

It is known to employ methyl cellulose (also known as methyl cellulose ether) as the dispersing agent in these suspension polymerizations of vinyl chloride and of numerous other monomers. Not only in the case of methyl cellulose but also in the case of other similar materials employed as dispersants in suspension polymerization, it has generally been recognized that the higher the molecular weight of the dispersant, the more effective it is for use in these polymerizations with respect to the character of the resulting polymers.

We have discovered that contrary to the general rule, in the specific case of the suspension polymerization of monomeric material substantially consisting of vinyl chloride amounting to more than 50% and other monoethylenically unsaturated monomer copolymerizable with the vinyl chloride amounting to 0% to less than 50% by weight of the monomeric material to be polymerized while dispersed in water, marked improvements in the polymerization procedure itself or in the character of the vinyl chloride polymer are obtained by employing as dispersant a very low molecular weight methyl cellulose, one having a solution viscosity no greater than 25 centipoises (cps.). Solution viscosities are a measure of the relative molecular weights of the various methyl celluloses; the higher the solution viscosity, the greater the molecular weight. The term "solution viscosity" as applied to methyl cellulose refers to the viscosity of a 2% solution of the methyl cellulose in water at 20° C.

In employing the process of our invention, vinyl chloride alone or together with a minor amount of other monoethylenically unsaturated monomer copolymerizable therewith, is polymerized while dispersed in water in the presence of a catalyst promoting the polymerization and a methyl cellulose having a solution viscosity no greater than 25 cps. Except for the use of methyl cellulose of this particular character, other conditions for the polymerization may be those well-known in the art for polymerizing vinyl chloride in aqueous dispersions. The use of the low molecular weight methyl celluloses employed in carrying out our invention results in greatly reduced pre-coagulation of the polymer in the reaction vessel, and gives products largely consisting of small and relatively uniformly sized particles. This is important to the resin products having desirable processing characteristics.

The process of our invention is especially suitable for polymerizing a monomer material which substantially consists of vinyl esters and more than 50% of the vinyl esters is vinyl chloride. It has been found particularly effective in making polyvinyl chloride and in copolymerizing vinyl chloride-vinyl acetate mixtures in which the vinyl chloride amounted to about 85% or more by weight of the monomer mixture. Without limiting our invention thereto, preferred polymerization conditions will now be described.

About .01% to 2% of the methyl cellulose by weight of the monomer has been employed to good effect. However, we have found it best to employ 0.05% to 0.50% methyl cellulose based on the weight of the monomer. The optimum concentrations of the methyl cellulose for making resins especially adapted for particular purposes vary, but we found them generally to be within this range.

During polymerization, the reaction mixture may be maintained at temperatures in the range 35° C. to 80° C., but it is especially advantageous using the low molecular weight methyl celluloses to maintain a substantially constant temperature within the range about 45° C. to about 70° C. For example, in polymerizing vinyl chloride alone, we found that by maintaining the reaction mixture at a temperature within the range about 55° C. to about 70° C. the character of the resulting polyvinyl chloride makes it especially adaptable for treatment on blending rolls, and processing without the addition of plasticizers to make hard, rigid products by extrusion of molding operations. With lower temperatures maintained of within the range about 45° C. to about 60° C., we found the resulting polyvinyl chloride is particularly suitable for use as a dry-blending resin in the processing of which the resin is blended with plasticizers.

While the essential components of the polymerization mixture have been described above, in operating within the scope of our invention it is permissible to have present during the polymerization other materials which may be desirable.

In the following examples illustrating specific embodiments of our invention, unless otherwise specified the amounts of materials are given in parts by weight.

Example 1.—A stainless steel bomb was charged with 200 parts distilled water containing in solution 0.5 part of methyl cellulose having a solution viscosity of 15 cps. The bomb contained ¼" diameter stainless steel balls, their total weight being 1.15 times that of the water charged. The solution in the bomb was frozen, and 0.2 part lauroyl peroxide added to catalyze the polymerization reaction. Distilled, chilled, liquid vinyl chloride monomer was then added in slight excess over 100 parts. The cover was placed on the bomb and the excess vinyl chloride boiled out to remove air. The bomb was sealed and then tumbled end-over-end while being maintained at 50° C. for a reaction period of 24 hours. At the end of this time about 92% of the monomer had been converted to polymer. The resulting slurry of polyvinyl chloride in water was stirred with added water and then filtered, and the filter cake washed with water. The polymer product was dried at 50° C.

The dry polymer produced by the process of this example had a mesh size such that 54% passed a 70-mesh screen. Substantially no pre-coagulation of polymer occurred in the bomb; there being just visible a very small amount of solid left on the walls of the bomb in emptying it.

Repeating the above described procedure except that a methyl cellulose having a solution viscosity of 25 cps. was employed as dispersant, 61% of the dried polymer product passed a 70-mesh screen. There was no more than a very small amount of pre-coagulation, as evidenced by only a slightly visible amount of solid left on the bomb walls.

In contrast to the foregoing, when the procedure of this example is modified to employ methyl cellulose having a solution viscosity of 1500 cps. or one having a solution viscosity of 4000 cps., none of the dried polymer product passed a 70-mesh screen. Nearly all of the polymer was pre-coagulated in the bomb.

*Example 2.*—A 20-gallon glass-lined steel autoclave, 18 inches in diameter and 20 inches high, was charged with 80 parts of deionized water containing 0.2 part of a methyl cellulose having a solution viscosity of 15 cps. The materials were cooled to below 20° C., and 0.04 part lauroyl peroxide added. A cover with valved inlet and outlet was placed on the autoclave and vinyl chloride gas was flushed through the vapor space in the autoclave to remove air. The outlet valve was closed and forty parts of distilled, liquid vinyl chloride monomer was then charged under pressure. The contents of the autoclave were stirred by an impeller agitator having a 15-inch span, operated at 190 r.p.m. to maintain the monomer dispersed in the aqueous medium, and maintained at 50° C. for a period of 24½ hours. At the end of this time the internal pressure in the autoclave had dropped and leveled off at a low value, showing the reaction essentially complete. The polymer dispersion was removed from the autoclave, filtered, washed with water on a vacuum filter and dried at 80° C.

In carrying out the process of this example, the final dried polymer product was of small particle size such that 85% passed through a 70-mesh screen. By contrast, when this procedure was altered to employ a methyl cellulose having a solution viscosity of 4000 cps. with a reaction time of 38 hours to essential completion of the reaction, three-fourths of the resulting polymer was precoagulated as a large solid mass within the autoclave. The remaining resin which drained from the autoclave with the aqueous reaction medium was so coarse that only 25% of it passed through a 70-mesh screen.

*Example 3.*—A 50-gallon glass-lined autoclave, provided with a heating or cooling jacket, was charged with 271 pounds deionized deaerated water and cooled below 20° C. by passing cold water through the jacket. One hundred forty-six grams methyl cellulose having a solution viscosity of 15 cps. dissolved in 4 liters deionized water was added. Lauroyl peroxide, 63.5 grams, was added as catalyst and the vapor space of the autoclave cleared of oxygen and flushing with vinyl chloride vapor, and 140 pounds distilled liquid vinyl chloride monomer was charged under pressure.

The autoclave contents were stirred by a 3-bladed impeller agitator having a 20-inch span and rotated at 150 r.p.m. The temperature was raised to 51° C. and maintained there by passing steam or cold water into the hot water circulated through the jacket. Reaction was continued for 26½ hours, after which time the pressure had dropped from 97 to 50 p.s.i.g. and leveled off, indicating the end of the reaction. The pressure was released. The sandy dispersion of resin in water was separated from mother liquor and washed with 280 pounds deionized water in a centrifuge to give a cake containing 21% moisture. This wet cake was dried at 723 C. in a tray dryer for 16 hours, screened through a 14-mesh screen to break up loose agglomerates and remove coarse particles, and was then blended by tumbling for one hour in a rotating drum. The product was a fine white powder of polyvinyl chloride in amount corresponding to a yield of 86% of theoretical based on the vinyl chloride supplied to the polymerization mixture.

This resin was compounded to a dry blend as follows: A mixture of 400 grams resin, 12 grams of a mixture of stabilizers, and 0.8 gram of a polyethylene wax was preheated to 160° F. in a steam jacketed sigma-blade dough mixer by very low pressure steam. Then 180 grams of a mixture of 120 grams dioctyl phthalate, dioctyl adipate, and polyester plasticizers was added slowly over a period of 4 minutes, with continuous mixing. The batch was mixed an additional 19 minutes, using low pressure steam to raise the temperature gradually to 220° F. by the end of the mixing cycle. It was then dumped, cooled, screened through 20-mesh screen, and stored. The resulting dry blend was a dry powder, free-flowing, and lump-free.

The dry blend was extruded to form tape having good gloss, no gel, smooth surface, good clarity and excellent fusion characteristics. The dry blend fed readily through a hopper to the extruder.

The properties of the dry blend and extruded article described above also characterized the dry blends of polyvinyl chloride prepared by us by processes similar to that of this example in which the methyl cellulose amounted to about 0.23% to about 0.25% by weight of the monomer, in the polymerization mixture.

*Example 4.*—A 20-gallon glass-lined steel autoclave like that employed in Example 3 was charged with 80 pounds deionized deaerated water containing in solution 0.2 pound methyl cellulose having a solution viscosity of 15 cps., 0.08 pound lauroyl peroxide, and 2 pounds trichloroethylene. Vinyl acetate amounting to 5.2 pounds was added, and the vapor space in the autoclave was swept with a mixture of gaseous vinyl chloride and nitrogen to remove the air. Thirty-five pounds distilled, liquid vinyl chloride monomer was then added and the autoclave closed. The reaction mixture was stirred by a 15-inch 3-bladed impeller agitator rotating at 190 r.p.m., and the autoclave contents were heated to and maintained at 50° C. by heating or cooling media passed through the jacket of the autoclave as required.

After 31 hours at 50° C. the pressure in the autoclave had dropped from an initial value of about 95 p.s.i.g. to 35 p.s.i.g. The residual pressure was then vented and the fine dispersion of copolymer in the aqueous medium was rinsed out of the autoclave, leaving the autoclave entirely free from precoagulated material on the autoclave walls. The copolymer was separated by centrifuging, washed with water and dried. The product thus obtained amounted to 87.6% yield of theoretical and was in the form of a fine, white powder, of which 94% passed through a 70-mesh screen in a wet-screening test.

*Example 5.*—The process of Example 1 was repeated except that 15 parts of distilled vinyl acetate was introduced into the bomb, followed by introduction of cold, liquid vinyl chloride in slight excess over 85 parts, the excess being boiled out to remove air from the bomb. At the end of the 24-hour reaction period at 50° C., the bomb was opened and the polymer slurry filtered. The polymer was washed with water and dried. A 92.6% yield of copolymer was obtained, all of which passed a 20-mesh screen, and 22% passed a 70-mesh screen. There was little precoagulation of polymer; there being just visible a very small amount of solid left on the walls of the bomb in emptying it.

We claim:

1. In a process wherein a monomeric material substantially consisting of members of the group consisting of vinyl chloride and mixtures of vinyl chloride with vinyl acetate, of which mixtures more than 50% consists of vinyl chloride, is polymerized in water containing peroxide catalyst promoting the polymerization and while dispersed in said water by a dispersing agent, that improvement which comprises having present as said dispersing agent not less than 0.01%, by weight of the monomers, of methyl cellulose having a solution viscosity no greater than 25 cps. as essentially the entire dispersant, and maintaining the polymerization mixture at a temperature no higher than about 80° C.

2. The process of claim 1 in which the catalyst present is lauroyl peroxide.

3. The process of claim 1 in which the methyl cellulose has a solution viscosity of 10 cps. to 25 cps., said methyl cellulose amounts to 0.01% to 2% by weight of the monomers present and the polymerization mixture is maintained at 35% C. to 80° C.

4. The process of claim 3 in which the catalyst present is a peroxide.

5. The process of claim 3 in which lauroyl peroxide is present as the catalyst promoting the polymerization of the monomeric material.

6. The process of claim 3 in which the monomeric material is vinyl chloride.

7. The process of claim 3 in which the monomeric material is a mixture of vinyl chloride and vinyl acetate containing at least 85% vinyl chloride.

8. The process of claim 6 in which lauroyl peroxide is present in the polymerization mixture to catalyze the polymerization of the monomers.

9. The process of claim 6 in which the catalyst present is a peroxide.

10. The process of claim 7 in which lauroyl peroxide is present in the polymerization mixture to catalyze the polymerization of the monomers.

References Cited in the file of this patent

UNITED STATES PATENTS

| | | |
|---|---|---|
| 2,494,517 | Naps | Jan. 10, 1950 |
| 2,528,469 | Condo et al. | Oct. 31, 1950 |
| 2,538,051 | Schick | Jan. 16, 1951 |

UNITED STATES PATENT OFFICE

CERTIFICATION OF CORRECTION

Patent No. 2,951,062                                 August 30, 1960

Rudolph D. Deanin et al.

It is hereby certified that error appears in the above numbered patent requiring correction and that the said Letters Patent should read as corrected below.

Column 2, line 46, for "of molding" read -- or molding --; line 47, after "maintained" strike out "of"; column 3, line 65, for "and flushing" read -- by flushing --; column 4, line 4, for "723 C." read -- 72° C. --.

Signed and sealed this 4th day of July 1961.

(SEAL)
Attest:

ERNEST W. SWIDER                                      DAVID L. LADD
Attesting Officer                                          Commissioner of Patents